(12) United States Patent
Alomerovic et al.

(10) Patent No.: US 12,704,008 B2
(45) Date of Patent: Aug. 11, 2026

(54) ELECTRICAL ENCLOSURE DOOR STABILIZER

(71) Applicant: Robroy Enclosures, Inc., Belding, MI (US)

(72) Inventors: Adnan Alomerovic, Grand Rapids, MI (US); Roger A. Schroder, Greenville, MI (US)

(73) Assignee: Robroy Enclosures, Inc., Belding, MI (US)

( * ) Notice: Subject to any disclaimer, the term of this patent is extended or adjusted under 35 U.S.C. 154(b) by 241 days.

(21) Appl. No.: 18/512,481

(22) Filed: Nov. 17, 2023

(65) Prior Publication Data

US 2024/0167305 A1 May 23, 2024

Related U.S. Application Data

(60) Provisional application No. 63/384,346, filed on Nov. 18, 2022.

(51) Int. Cl.
*E05C 17/54* (2006.01)
*H02B 1/30* (2006.01)

(52) U.S. Cl.
CPC ............. *E05C 17/54* (2013.01); *H02B 1/306* (2013.01)

(58) Field of Classification Search
CPC ................................ E05C 17/54; H02B 1/306
See application file for complete search history.

(56) References Cited

U.S. PATENT DOCUMENTS

| | | | | |
|---|---|---|---|---|
| 2,593,996 | A | 4/1952 | Dolton et al. | |
| 5,584,458 | A | 12/1996 | Rando | |
| 6,484,445 | B2 * | 11/2002 | Chang | E05B 65/0823 292/DIG. 16 |
| 8,282,156 | B1 * | 10/2012 | Thiele | E05F 5/003 296/207 |
| 8,510,994 | B2 * | 8/2013 | Scott | E05C 3/048 292/297 |
| 9,279,278 | B2 * | 3/2016 | Ploskunak | E05C 7/04 |
| 9,316,033 | B2 * | 4/2016 | Yates | E05C 17/54 |
| 9,500,315 | B2 * | 11/2016 | Ajello | E05C 19/02 |
| 9,856,682 | B1 * | 1/2018 | Cook | E05C 19/18 |
| 10,151,127 | B1 * | 12/2018 | Shell | E05C 19/182 |
| 10,501,968 | B2 * | 12/2019 | Maher | E05C 17/08 |
| 11,313,149 | B2 * | 4/2022 | Morrison | E05B 17/142 |
| 11,459,806 | B1 | 10/2022 | Bishop | |

(Continued)

FOREIGN PATENT DOCUMENTS

| | | | |
|---|---|---|---|
| DE | 348644 | A | 2/1922 |
| EP | 0151266 | A2 | 8/1985 |

*Primary Examiner* — Mark A Williams
(74) *Attorney, Agent, or Firm* — The Webb Law Firm

(57) ABSTRACT

An electrical enclosure door stabilizer device includes a body having a first portion and a second portion connected by a joint portion, a first member and a second member extending from the first portion and configured to form a recess, a third member extending from the joint portion and configured to be positioned between an electrical enclosure and a door of an electrical enclosure, and a securing mechanism positioned at an end of the second portion. The second portion includes a slot configured to receive an edge of an electrical enclosure and the securing mechanism is configured to removably secure the body to the electrical enclosure.

19 Claims, 16 Drawing Sheets

(56) References Cited

U.S. PATENT DOCUMENTS 11,624,220 B2 * 4/2023 Taylor .................. E05C 19/184
292/288
2014/0312634 A1 * 10/2014 Cushwa, Jr. ............. E06B 9/02
292/340
2023/0349211 A1 * 11/2023 Killian .................... E05C 17/54

* cited by examiner

ELECTRICAL ENCLOSURE DOOR STABILIZER

CROSS REFERENCE TO RELATED APPLICATION

This application claims the benefit of U.S. Provisional Patent Application No. 63/384,346, which was filed Nov. 18, 2022, the disclosure of which is incorporated by reference in its entirety.

BACKGROUND

Field of the Disclosure

The present disclosure relates to a door stabilizer device, and more particularly to a removable electrical enclosure door stabilizer device configured to hold an electrical enclosure door in a secure open position relative to an electrical enclosure body, which provides user safety and allows for quick and easy installation, removal, and use.

Description of Related Art

Electrical enclosures are well known cabinets or containers for electrical or electronic components or equipment including circuits, circuit breakers, cables, wires, switches, knobs, displays, and the like used in industrial, residential, and commercial applications. Electrical enclosures are used to prevent electrical shock, fire, and other exposure to electricians, technicians or other users servicing equipment housed in electrical enclosures, as well as the surrounding environment or others who may come in contact with electrical enclosures. Electrical enclosures also protect the contents from the surrounding environment and weather conditions such as precipitation, wind, and sun exposure. Electrical enclosures are offered in a variety of shapes, sizes, dimensions, and materials such as metal, plastic, polymer, and composite materials. The shape, size, dimensions, and materials are selected based on the needs of a particular application. A multitude of governing bodies promulgate regulations requiring that electrical enclosures used in specific applications meet certain minimum requirements. For example, regulations may dictate the features and performance of electrical enclosures in hazardous areas, such as chemical plants or mineral mines, to protect the surrounding environment from heat dissipation, radio frequency interference, or electrostatic discharge.

Electrical enclosures and the components within may overtime require repair, upgrade, installment, or other service. When required, electrical enclosures and components within are serviced in the field by electricians, technicians or other users. Access to the components within an electrical enclosure is gained by opening a covering, such as a hinged door. Servicing of the components within an electrical enclosure may require access to the components for minimal or extended periods of time. During servicing, users, their extremities, tools and other appendages may enter an electrical enclosure. Forces such as gravity, airflow, wind, weather or unintentional contact with the covering or door of an electrical enclosure while in an open position may cause the door to close abruptly, causing harm to any user, extremity, tool or appendage that is caught between the door and the electrical enclosure.

Conventional electrical enclosures are often manufactured without a device to hold the door in a secure open position such as a door stabilizer device. Other conventional electrical enclosures may be manufactured with door stabilizer devices such as locking hinges, pneumatic struts or telescoping rods at an increased cost and with difficult installation compared to electrical enclosures manufactured without such a door stabilizer device. Conventional electrical enclosure door stabilizer devices require installation at the time of manufacture of the electrical enclosure or permanent aftermarket installation. Conventional aftermarket installation of door stabilizer device requires permanent installation and time consuming installation process requiring use of a multitude of tools and often more than one installer. Such aftermarket installation processes are not fit for installation in the field in many applications.

In view of the foregoing, there exists a need for a removable after-market door stabilizer device configured to hold an electrical enclosure door in a secure open position relative to an electrical enclosure body designed for easier installation, removal and use in the field with electrical enclosures to ease servicing and increase user safety.

SUMMARY

Accordingly, aspects of the present disclosure are directed to non-limiting embodiments of an electrical enclosure door stabilizer.

According to an aspect of the disclosure, a removable door stabilizer device for holding a door of an electrical enclosure in a fixed position includes a body having a first portion and a second portion connected by a joint portion. The device also includes a first member and a second member extending from the first portion and configured to form a recess. The device also includes a third member extending from the joint portion and configured to be positioned between the electrical enclosure and the door of the electrical enclosure. The device also includes a securing mechanism positioned at an end of the second portion. The second portion further includes a slot configured to receive an edge of the electrical enclosure. The securing mechanism of the device is configured to removably secure the body to the electrical enclosure.

According to another aspect of the disclosure, a removable door stabilizer device for holding a door of an electrical enclosure in a fixed position includes a body and the body includes a first portion having a first member and a second member extending from the first portion and configured to form a recess to receive the door of the electrical enclosure, a second portion having a slot configured to receive the edge of the electrical enclosure, and a joint portion connecting the first portion and the second portion at an angle and having a third member extending from the joint portion and configured to be positioned between the electrical enclosure and the door of the electrical enclosure. The device further includes a securing mechanism which may include a fastener and an aperture in the body configured to receive the fastener. The securing mechanism is positioned at an end of the second portion distal to the joint portion, and the securing mechanism is configured such that the aperture engages the fastener, the fastener extends through the aperture, and the fastener and the body apply a clamping force on the electrical enclosure to removably secure the body to the electrical enclosure. The body is a unitary structure of one-piece construction comprised of a single piece of material.

According to another aspect of the disclosure, a removable door stabilizer device for holding a door of an enclosure in a fixed position includes a body having a recess configured to receive a door, a slot configured to a receive a portion of the enclosure, and a member configured to be positioned between the door and the enclosure. The device further includes a securing mechanism configured to removably secure the body to the enclosure. The device is further configured to secure the door in an open position at an angle with respect to the enclosure, and the body is a unitary structure.

Non-limiting illustrative examples of the embodiments of the present disclosure will now be described in the following numbered clauses.

Clause 1: A device for holding a door of an electrical enclosure in a fixed position, the device comprising: a body having a first portion and a second portion connected by a joint portion; a first member and a second member extending from the first portion and configured to form a recess; a third member extending from the joint portion and configured to be positioned between the electrical enclosure and the door of the electrical enclosure; and a securing mechanism positioned at an end of the second portion; wherein the second portion comprises a slot configured to receive an edge of the electrical enclosure; and wherein the securing mechanism is configured to secure the body to the electrical enclosure.

Clause 2: The device of clause 1, wherein the securing mechanism comprises a fastener and an aperture in the body configured to receive the fastener.

Clause 3: The device of clause 1 or 2, wherein the fastener is a threaded fastener comprising a threaded shaft and a head.

Clause 4: The device of any of clauses 1-3, wherein the securing mechanism further comprises a cavity in the body configured to receive a nut and the nut is dimensioned and configured to receive the threaded fastener.

Clause 5: The device of any of clauses 1-4, wherein the joint portion is configured to position the first portion at an angle of between 90 degrees and 180 degrees with respect to the second portion.

Clause 6: The device of any of clauses 1-5, wherein the joint portion is configured to position the first portion at an angle of 135 degrees with respect to the second portion.

Clause 7: The device of any of clauses 1-6, wherein the body has a top surface defined by a top surface of the first portion, a top surface of the second portion, and a top surface of the joint portion.

Clause 8: The device of any of clauses 1-7, wherein the first member and the second member extend from the first portion perpendicularly to the top surface of the body, and the recess formed between the first member and the second member is configured to receive the door of the electrical enclosure.

Clause 9: The device of any of clauses 1-8, wherein the first member further comprises a retention lip extending perpendicularly from the first member and parallel to the top surface of the body.

Clause 10: The device of any of clauses 1-9, wherein the third member extends from the joint portion perpendicularly to the top surface of the body.

Clause 11: The device of any of clauses 1-10, wherein the third member further comprises a protrusion extending perpendicularly from the third member and parallel to the top surface of the body.

Clause 12: The device of any of clauses 1-11, wherein the slot is defined by a first projection extending from the second portion and a second projection extending from the second portion and the first projection and second projection are parallel.

Clause 13: The device of any of clauses 1-12, wherein a fourth member extends from the joint portion and is perpendicular to the top surface of the body.

Clause 14: The device of any of clauses 1-13, wherein the body of the device is 3-D printed.

Clause 15: The device of any of clauses 1-14, wherein the body of the device is injection molded.

Clause 16: The device of any of clauses 1-15, wherein the body is made of a polymeric material.

Clause 17: The device of any of clauses 1-16, wherein the securing mechanism comprises a pin and an aperture in the body configured to receive the pin.

Clause 18: The device of any of clauses 1-17, wherein the pin is a detent pin.

Clause 19: A removable door stabilizer device for holding a door of an electrical enclosure in a fixed position, the device comprising: a body, the body comprising: a first portion having a first member and a second member extending from the first portion and configured to form a recess to receive the door of the electrical enclosure; a second portion having a slot configured to receive the edge of the electrical enclosure; and a joint portion connecting the first portion and the second portion at an angle and having a third member extending from the joint portion and configured to be positioned between the electrical enclosure and the door of the electrical enclosure; and a securing mechanism comprising: a fastener; and an aperture in the body configured to receive the fastener, wherein the securing mechanism is positioned at an end of the second portion distal to the joint portion and the securing mechanism is configured such that the aperture engages the fastener, the fastener extends through the aperture, and the fastener and the body apply a clamping force on the electrical enclosure, to removably secure the body to the electrical enclosure, and wherein the body is a unitary structure of one-piece construction comprised of a single piece of material.

Clause 20: A removable door stabilizer device for holding a door of an enclosure in a fixed position, the device comprising: a body having a recess configured to receive a door, a slot configured to a receive a portion of the enclosure, and a member configured to be positioned between the door and the enclosure; and a securing mechanism configured to removably secure the body to the enclosure, wherein the device is further configured to secure the door in an open position at an angle with respect to the enclosure, and wherein the body is a unitary structure.

Further details and advantages of the various examples described in detail herein will become clear upon reviewing the following detailed description of the various examples in conjunction with the accompanying drawing figures.

BRIEF DESCRIPTION OF THE DRAWINGS

Additional advantages and details are explained in greater detail below with reference to the exemplary embodiments that are illustrated in the accompanying schematic figures, in which.

Corresponding reference characters indicate corresponding parts throughout the several views. The exemplifications set out herein illustrate exemplary embodiments of the disclosure, and such embodiments are not to be construed as limiting the scope of the disclosure in any manner.

DETAILED DESCRIPTION

Figure 1A:
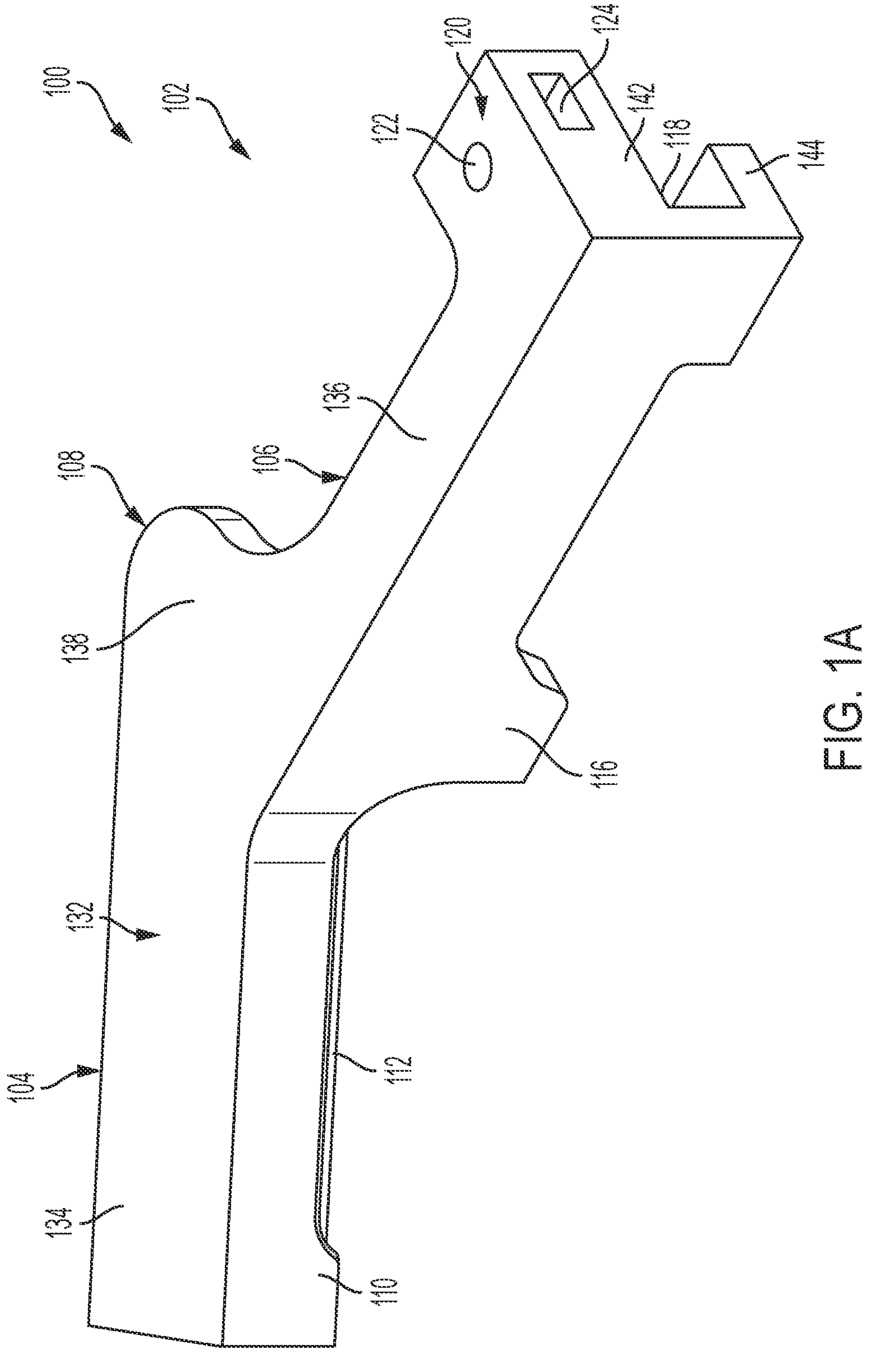
FIGS. 1A-1F are perspective views of a non-limiting embodiment of an electrical enclosure door stabilizer device in accordance with the present disclosure.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used in the specification and the claims, the singular form of "a," "an," and "the" include plural referents, such as unless the context clearly dictates otherwise. Additionally, as used herein, the terms "set" and "group" are intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Embodiments of the present disclosure are directed to a removable electrical enclosure door stabilizer device with features that provide user safety and allow for quick and easy installation, removal, and use during servicing of an electrical enclosure and the contents within. According to non-limiting embodiments, an electrical enclosure door stabilizer device may include a body having a first portion and a second portion connected by a joint portion, a first member and a second member extending from the first portion and configured to form a recess, a third member extending from the joint portion and configured to be positioned between an electrical enclosure and a door of an electrical enclosure, and a securing mechanism positioned at an end of the second portion. The second portion may include a slot configured to receive an edge of the electrical enclosure. Further, the securing mechanism may be configured to removably secure the body to the electrical enclosure.

In some non-limiting embodiments, the securing mechanism may include a fastener and an aperture in the body configured to receive the fastener. In some non-limiting embodiments, the fastener may be a threaded fastener included a threaded shaft and a head.

In some non-limiting embodiments, the securing mechanism may also include a cavity in the body configured to receive a nut, and the nut may be dimensioned and configured to receive the threaded fastener.

In some non-limiting embodiments, the joint portion may be configured to position the first portion at an angle of between 90 degrees and 180 degrees with respect to the second portion. In some non-limiting embodiments, the joint portion may be configured to position the first portion at an angle of 135 degrees with respect to the second portion.

In some non-limiting embodiments, the body may have a top surface defined by a top surface of the first portion, a top surface of the second portion, and a top surface of the joint portion. In some non-limiting embodiments, the first member and the second member may extend from the first portion perpendicularly to the top surface of the body, and the recess formed between the first member and the second member may be configured to receive the door of the electrical enclosure.

In some non-limiting embodiments, the first member may include a retention lip extending perpendicularly from the first member and parallel to the top surface of the body.

In some non-limiting, the third member may extend from the joint portion perpendicularly to the top surface of the body. In some non-limiting embodiments, the third member may further include a protrusion extending perpendicularly from the third member and parallel to the top surface of the body.

In some non-limiting embodiments, the slot may be defined by a first projection extending from the second portion and a second projection extending from the second portion and the first projection and second projection may be parallel.

In some non-limiting embodiments, a fourth member may extend from the joint portion and may be perpendicular to the top surface of the body.

In some non-limiting embodiments, the body may be 3-D printed. In some non-limiting embodiments, the body may be injection molded. In some non-limiting embodiments, the body may be made of a polymeric material.

In some non-limiting embodiments, the securing mechanism may include a pin and an aperture in the body may be configured to receive the pin. In some non-limiting embodiments, the pin may be a detent pin.

In this way, embodiments of the present disclosure allow for holding of electrical enclosure door in a secure open position relative to an electrical enclosure body, which provides user safety and allows for quick and easy installation, removal, and use. Embodiments of the present disclosure allow for installing the device in an electrical enclosure in situations where an electrical enclosure may be in a wide range of locations or orientations and where the electrical enclosure door may need to be held open due to potential danger posed by outside forces such as gravity, airflow, wind, weather or unintentional contact.

Referring now to FIGS. 1A-1F, FIGS. 1A-1F are perspective views of a non-limiting embodiment of an electrical enclosure door stabilizer device 100. As shown in FIGS. 1A-1F, electrical enclosure door stabilizer device 100 may include body 102 having first portion 104 and second portion 106 connected by joint portion 108. As shown in FIGS. 1A-1F, first portion 104 may be an elongated portion or section of body 102 which extends distally from joint portion 108. Similarly, second portion 106 may be an elongated portion or section of body 102 which extends distally from joint portion 108. Joint portion 108 generally includes the portion or section of body 102 where first portion 104 and second portion 106 meet, as well as the features of body 102 that are proximate thereto. In the embodiments shown and described herein, body 102 is a unitary structure of one-piece construction comprised of a single piece of material. However, it is contemplated that the various components of body 102 may be separable components and may be mechanically, chemically, adhesively, or otherwise attached to each other.

The appended figures show device 100 configured with first portion 104 on the left and second portion 104 on the right for an electrical enclosure having a hinge connecting the electrical enclosure door on the left when shown from a front side view. However, as will be easily appreciated by one skilled in the art, it is also contemplated that first portion 104 and second portion 106 may be reversed to hold a door with a hinge on the right when shown from a front side view.

Figure 1B:
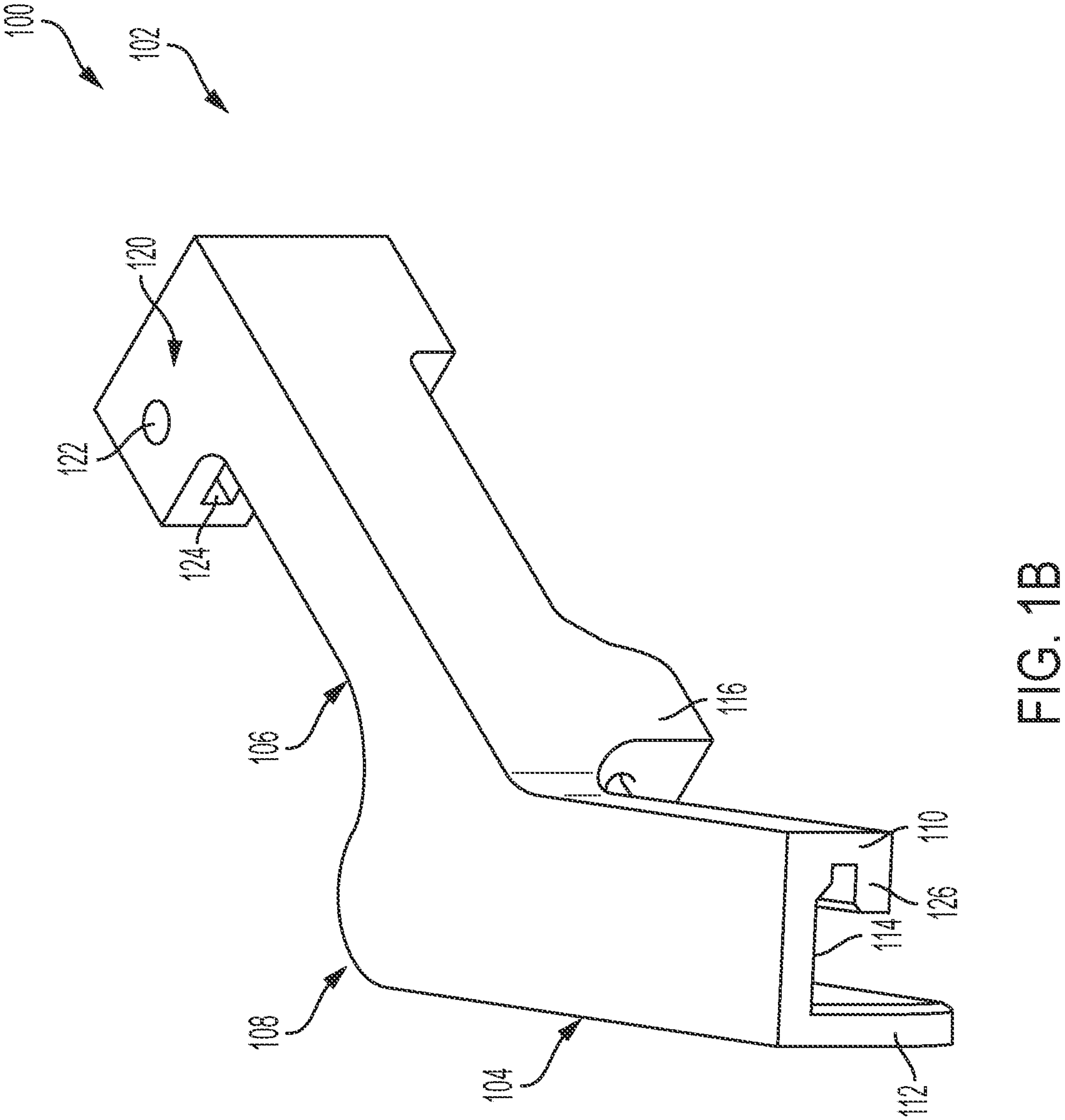
Figure 1C:
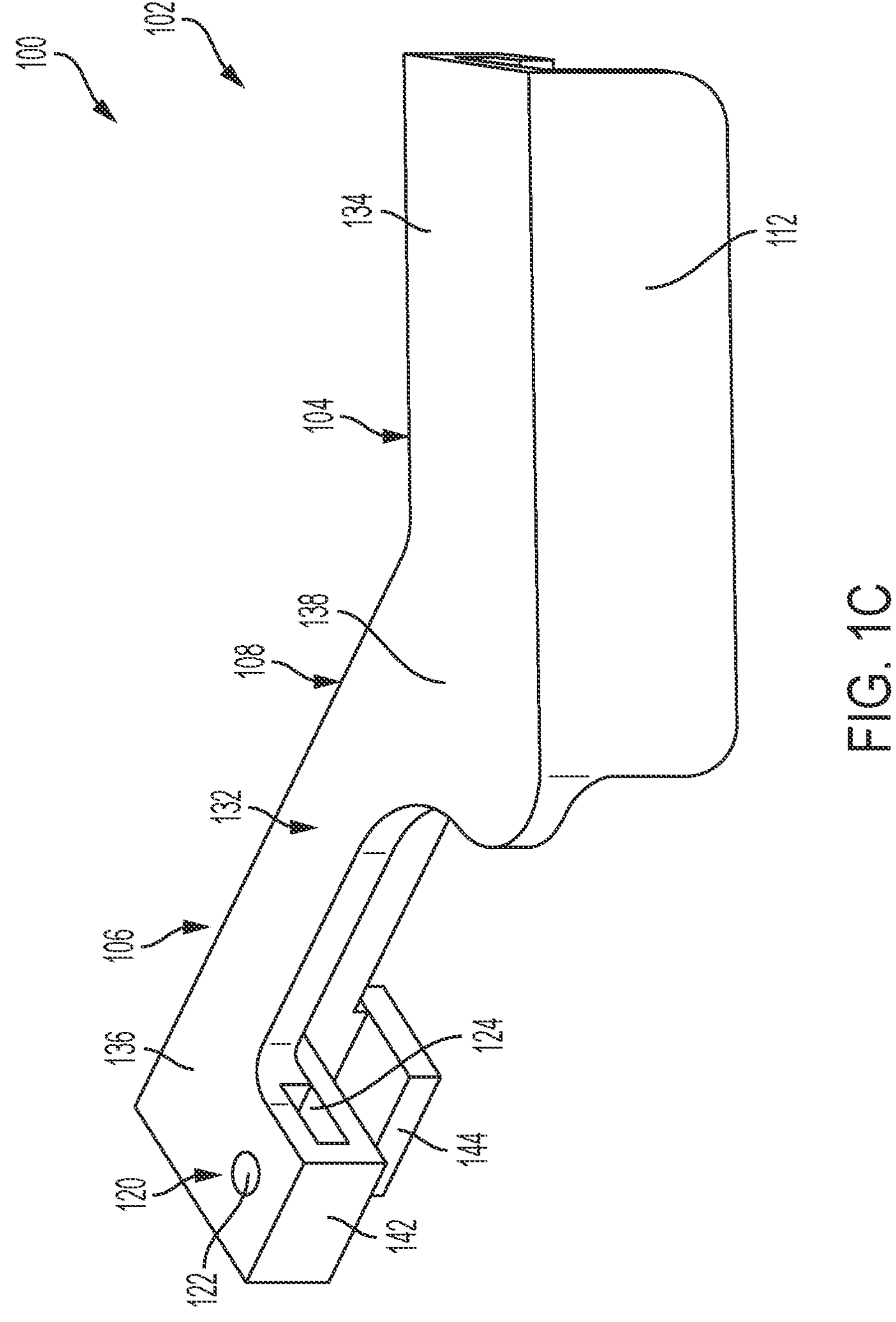
Figure 1D:
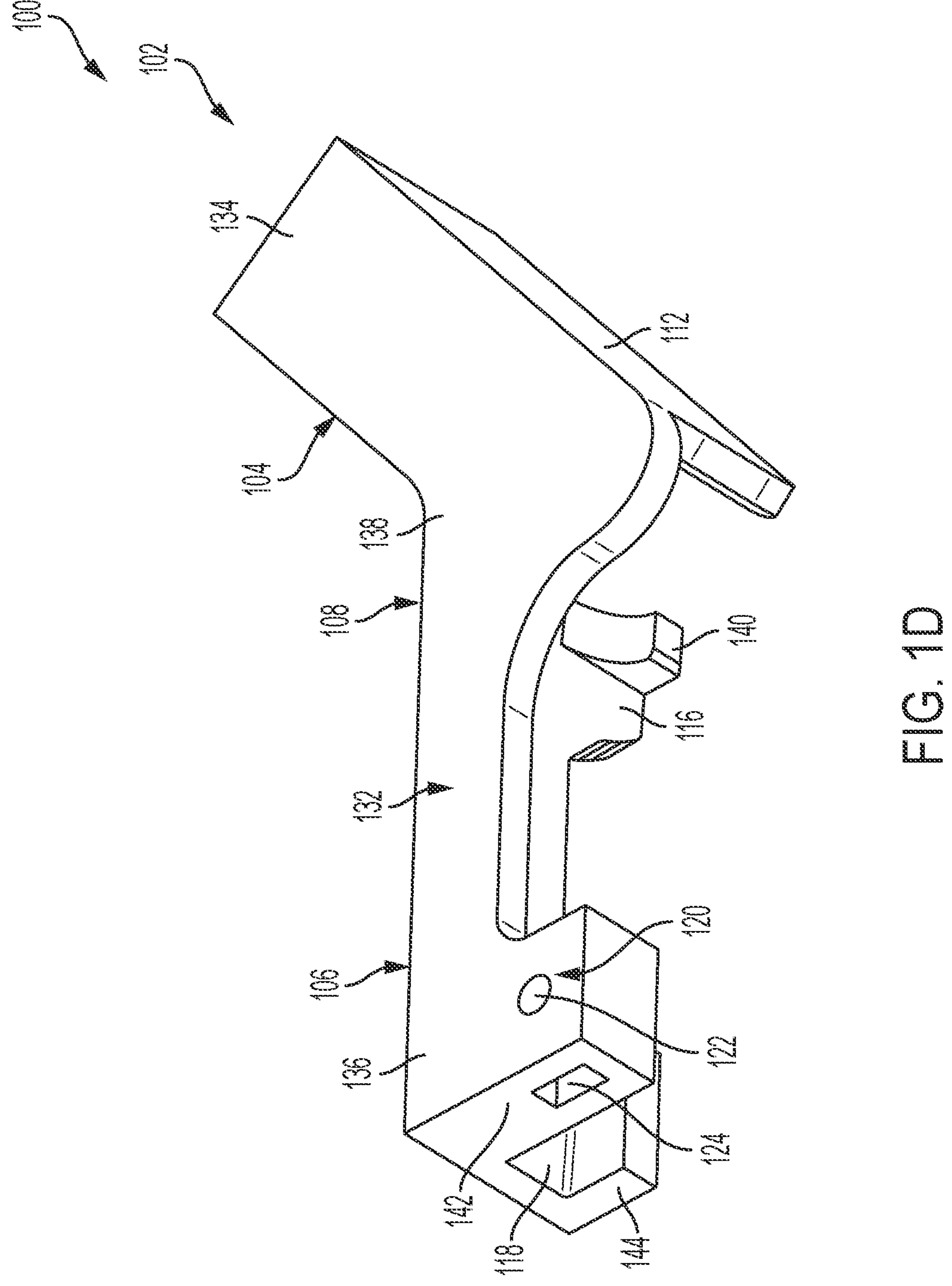
Figure 1E:
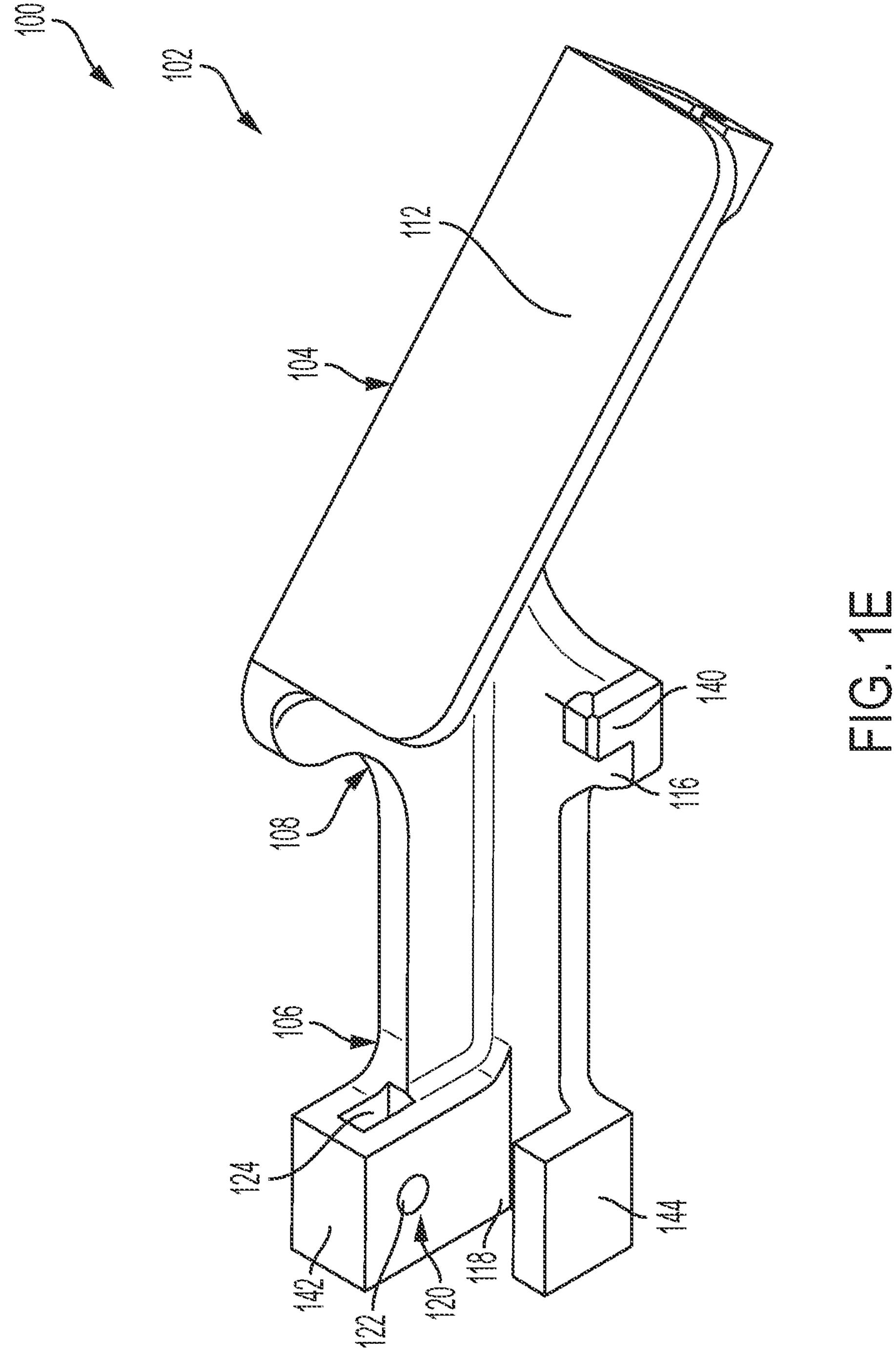
Figure 1F:
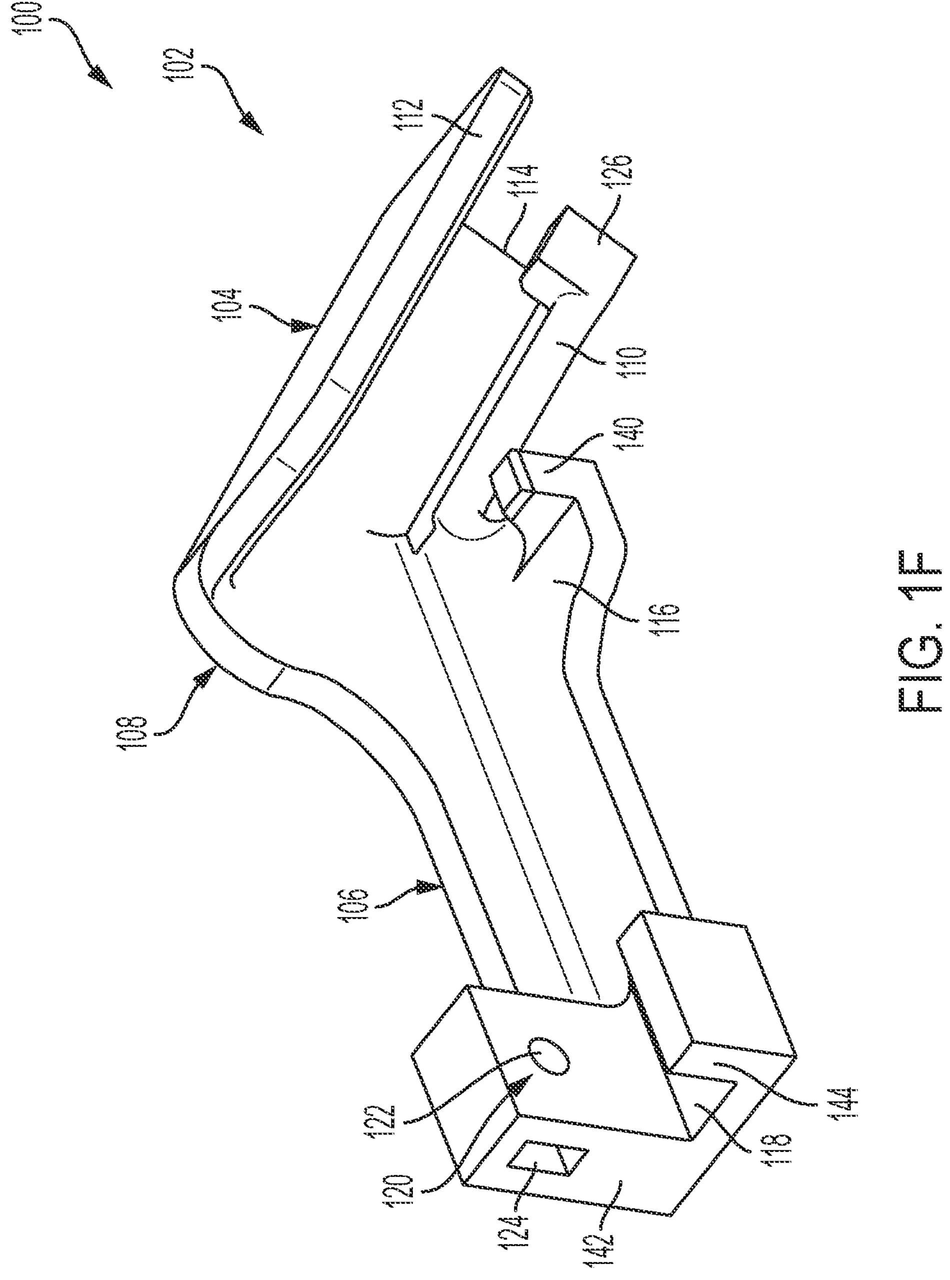

As further shown in FIGS. 1A-1F, first member 110 and second member 112 may extend from first portion 104. As shown in FIGS. 1B and 1F, first member 110 and second member 112 may be configured to form recess 114 between first member 110 and second member 112. The recess 114 may be configured to receive and secure an electrical enclosure door therein when the electrical enclosure door stabilizer device 100 is properly positioned as will be discussed in greater detail hereinafter. As shown in FIGS. 1A-1B and 1D-1F, third member 116 may extend from joint portion 108 and third member 116 may be configured to be positioned between an electrical enclosure and a door of an electrical enclosure. As further shown in FIGS. 1A-1F, securing mechanism 120 may be positioned at an end of second portion 106. As shown in FIGS. 1A and 1D-1F, second portion 106 may include a slot 118 and slot 118 may be configured to receive an edge of an electrical enclosure. The securing mechanism 120 may be configured to secure body 102 to the electrical enclosure as will be discussed in greater detail hereinafter.

As further shown in FIGS. 1A-1F, securing mechanism 120 may include a fastener and aperture 122 in body 102 configured to receive the fastener. The fastener may be a threaded fastener including a threaded post and a head, such as a bolt, screw, or the like. The aperture may be threaded to mate with the threaded fastener. In some non-limiting embodiments, the fastener may be another fastener such as a clip, a pin, a nail or the like. In some non-limiting embodiments, securing mechanism 120 may further include cavity 124 in body 102 and cavity 124 may be configured to receive a fastener mate such as a nut. Further, the fastener mate may be threaded, dimensioned or otherwise configured to mate with the fastener. In some non-limiting embodiments, cavity 124 may be configured to receive a clip, a flange, a button or the like of the fastener.

In some non-limiting embodiments, joint portion 108 of electrical enclosure door stabilizer device 100 may be configured to position first portion 104 at an angle of between ninety (90) degrees and one hundred and eighty (180) degrees with respect to second portion 106. In some non-limiting embodiments, joint portion 108 of electrical enclosure door stabilizer device 100 may be configured to position first portion 104 at an angle of one hundred and thirty five (135) degrees with respect to second portion 106.

As shown in FIGS. 1A and 1C-1D, body 102 of electrical enclosure door stabilizer device 100 may have a top surface 132, and top surface 132 may be defined by top surface 134 of first portion 104, top surface 136 of second portion 106 and top surface 138 of joint portion 108.

In some non-limiting embodiments, first member 110 and second member 112 may extend from first portion 104 perpendicularly to top surface 132 of body 102. As shown in FIG. 1B, recess 114 may be formed between first member 110 and second member 112, and recess 114 may be configured to receive a door of an electrical enclosure. As further shown in FIG. 1B, first member 110 may include retention lip 126 and retention lip 126 may extend perpendicularly from first member 110 and parallel to top surface 132 of body 102.

In some non-limiting embodiments, third member 116 may extend from joint portion 108 perpendicularly to top surface 132 of body 102. As shown in FIGS. 1D-1F, third member 116 may include protrusion 140 and protrusion 140 may extend perpendicularly from third member 116 and parallel to top surface 132 of body 102.

In some non-limiting embodiments, slot 118 of second portion 106 may be defined by first projection 142 and second projection 144, and first projection 142 may be parallel to second projection 144.

In some non-limiting embodiments, body 102 of electrical enclosure door stabilizer device 100 may be 3-D printed. In some non-limiting embodiments, body 102 of electrical enclosure door stabilizer device 100 may be injection molded. In some non-limiting embodiments, body 102 of electrical enclosure door stabilizer device 100 may be made of a polymeric material.

Figure 2A:
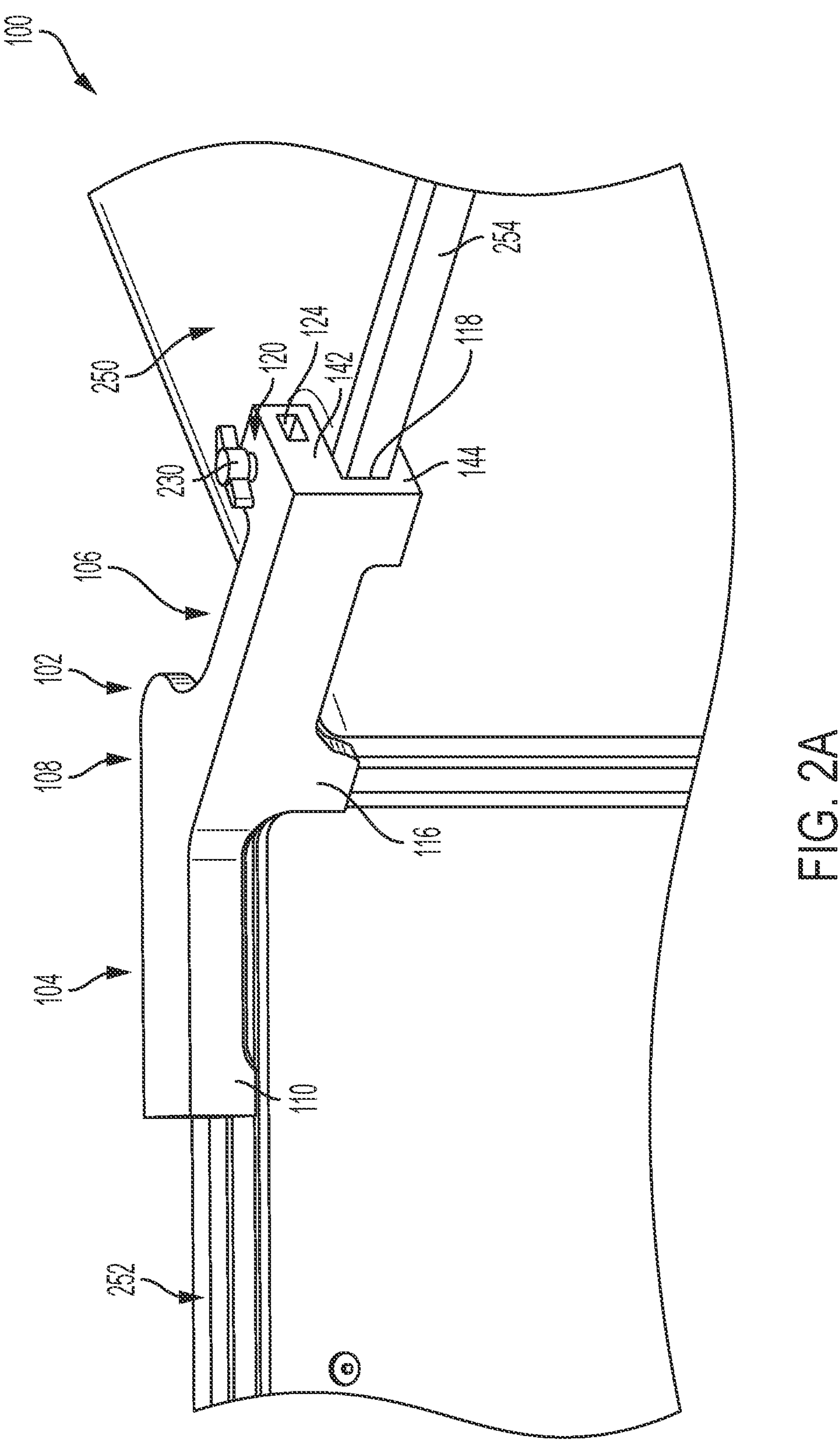
FIGS. 2A-2F are perspective views of a non-limiting embodiment of an implementation of an electrical enclosure door stabilizer device in accordance with the present disclosure.
Figure 2B:
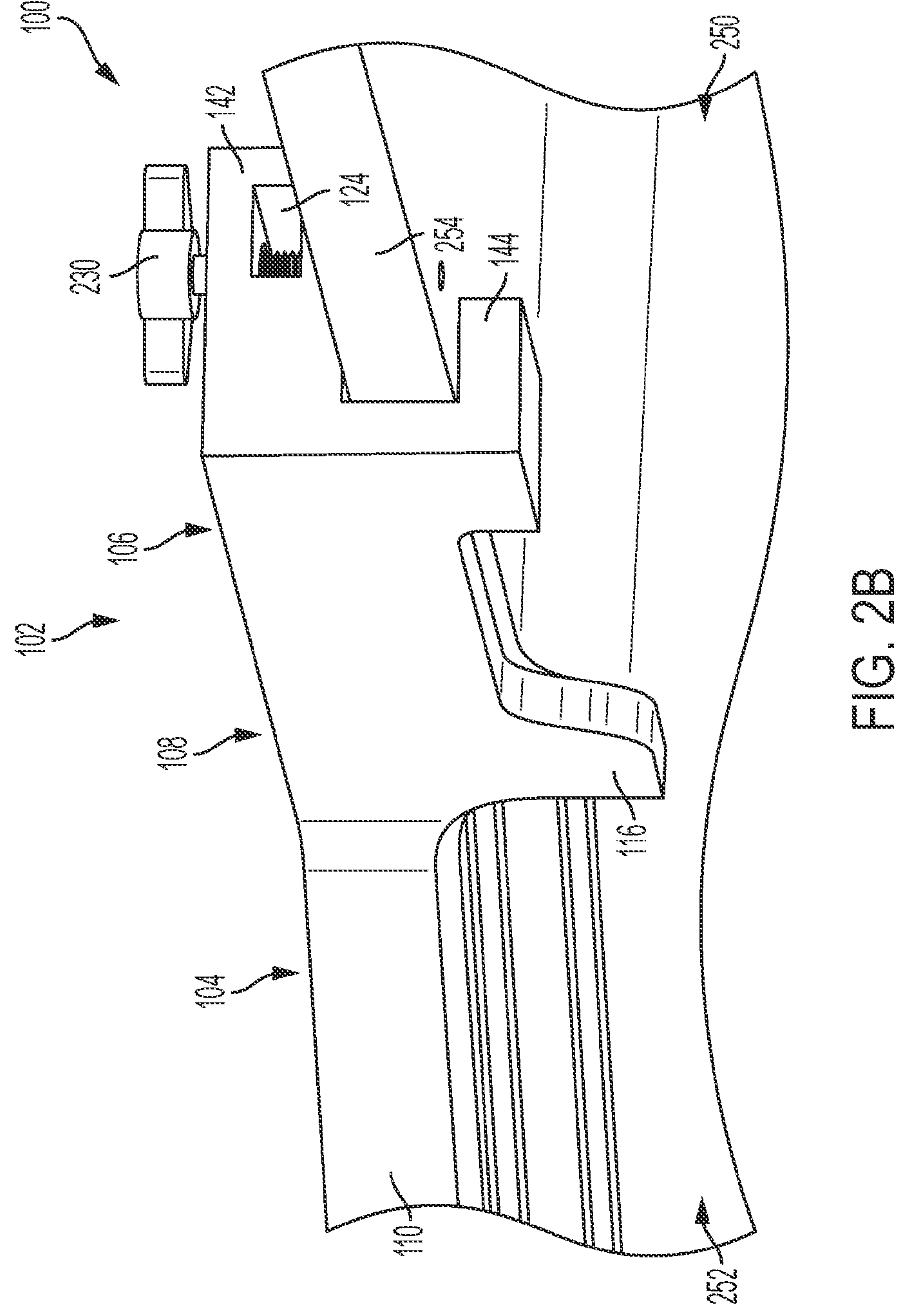

Referring now to FIGS. 2A-2F, FIGS. 2A-2F are perspective views of a non-limiting embodiment of an implementation of electrical enclosure door stabilizer device 100 shown in FIGS. 1A-1F. As shown in FIGS. 2A-2F, electrical enclosure door stabilizer device 100 may include body 102 having first portion 104 and second portion 106 connected by joint portion 108 as described in greater detail hereinabove. As further shown in FIGS. 2A-2F, first member 110 and second member 112 may extend from first portion 104. As shown in FIGS. 2A-2C and 2F, third member 116 may extend from joint portion 208 and third member 216 may be configured to be positioned between electrical enclosure 250 and door 252 of electrical enclosure 250. As further shown in FIGS. 2A-2F, securing mechanism 120 may be positioned at an end of second portion 106, distal to joint portion 108. As shown in FIG. 2A, second portion 106 may include slot 118 and slot 118 may be configured to receive edge 254 of electrical enclosure 250. Securing mechanism 120 may be configured to secure body 102 of the electrical enclosure door stabilizer device 100 to the electrical enclosure 250.

As shown in FIGS. 2A-2B and 2D-2F, securing mechanism 120 may include threaded fastener 230 and an aperture in body 102 configured to receive threaded fastener 230. Threaded fastener 230 may include a threaded post and head. As shown in FIGS. 2A-2B and 2D-2F, threaded fastener 230 is a wing bolt having a threaded post and a winged head. However, the fastener may be a different bolt or another fastener such as screw, pin, nail, clip, or the like, as discussed above. In some non-limiting embodiments, the securing mechanism of the electrical enclosure door stabilizer device may include a pin and an aperture in the body of the electrical enclosure stabilizer device configured to receive a pin. In some non-limiting embodiments, the pin may be a detent pin.

In some non-limiting embodiments, securing mechanism 120 may further include cavity 124 in body 102 and cavity 124 may be configured to receive a fastener mate such as a nut, a rivet, a collar, or the like. Further, the fastener mate may be threaded, dimensioned, or otherwise configured to mate with the fastener. In some non-limiting embodiments, cavity 124 may configured to receive a part of the fastener itself such as part of a clip, a flange, a button or the like. For example, in embodiments where the fastener is a detent pin, cavity 124 may be configured to receive the button that protrudes from the pin.

In some non-limiting embodiments, securing mechanism 120 may be configured such that the aperture engages the fastener, the fastener extends through the aperture, and the fastener and body 102 apply a clamping force on electrical enclosure 250 to secure body 102 to electrical enclosure 250.

Figure 2C:
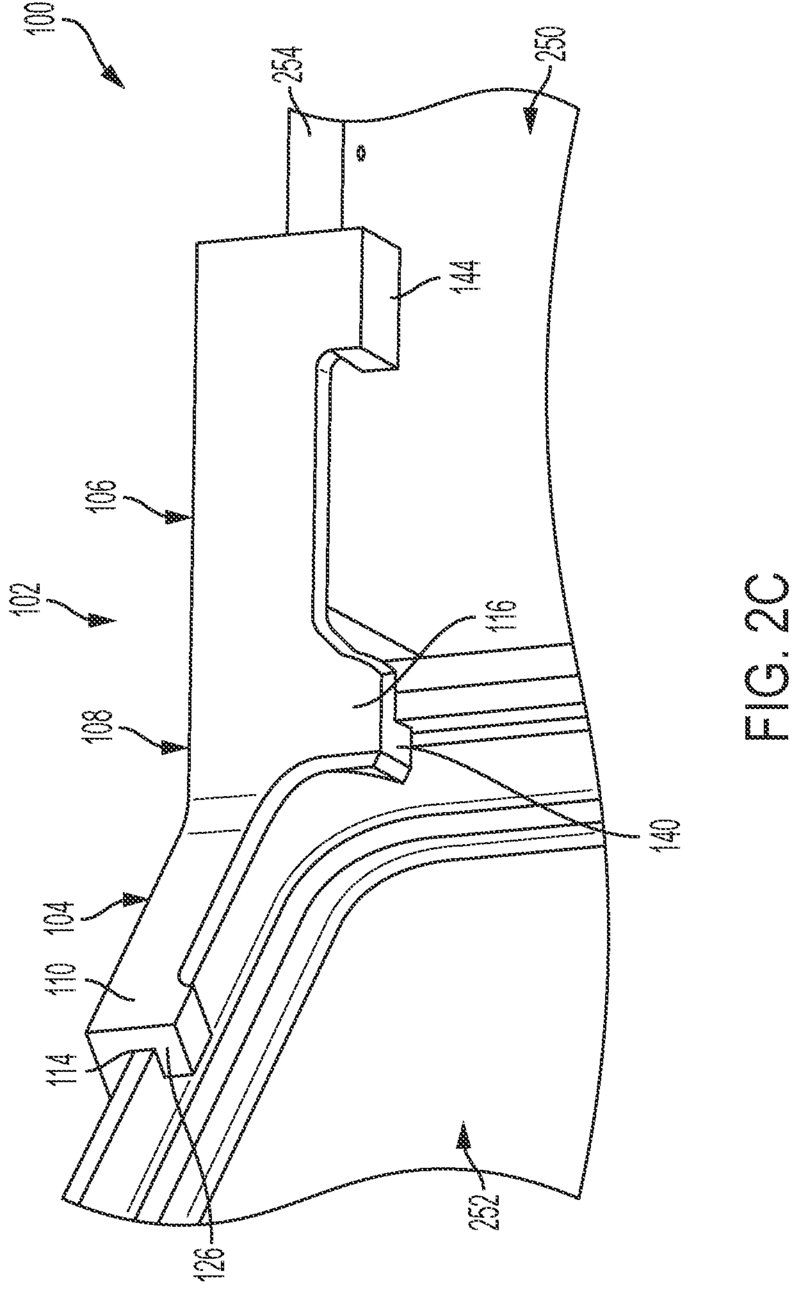
Figure 2D:
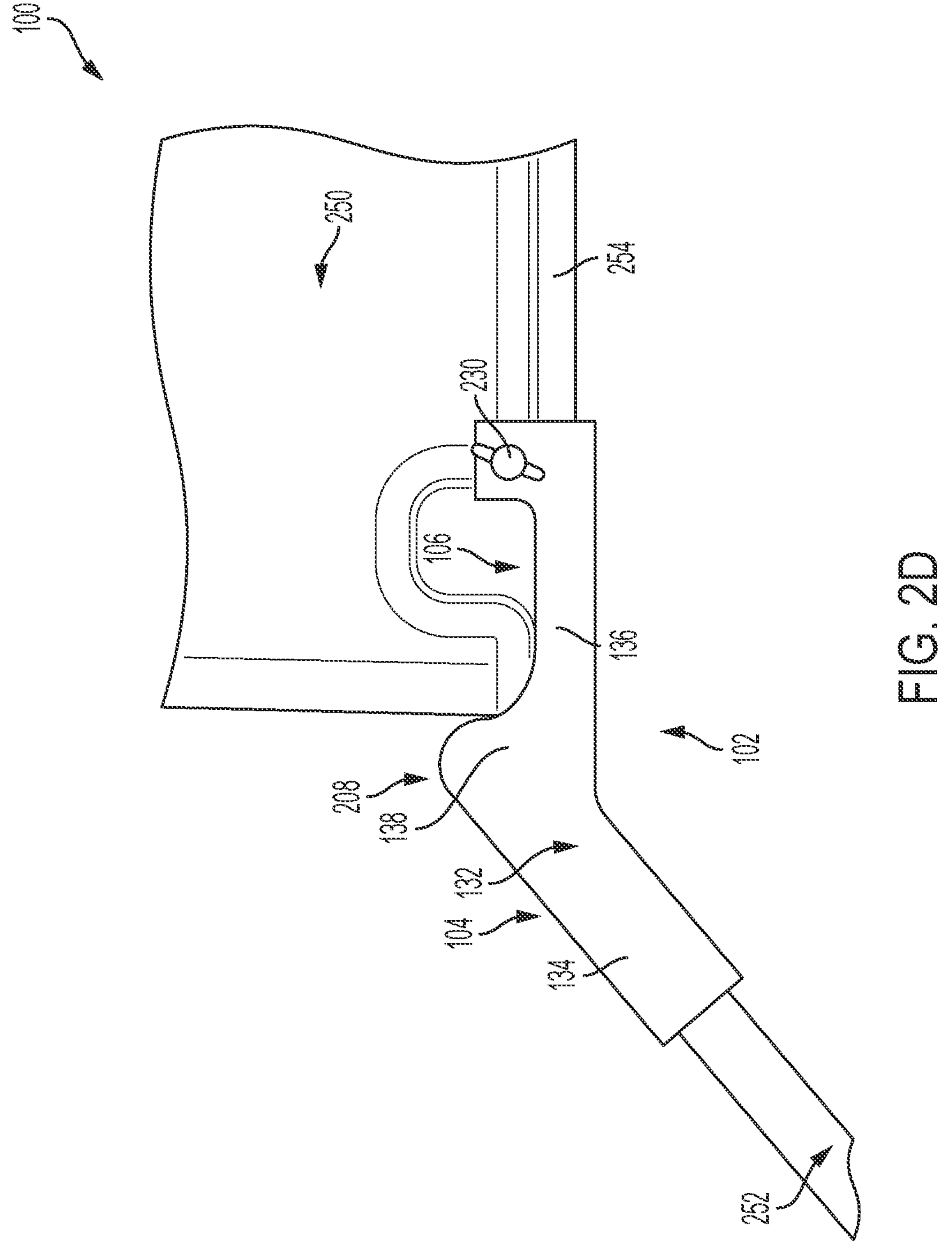
Figure 2E:
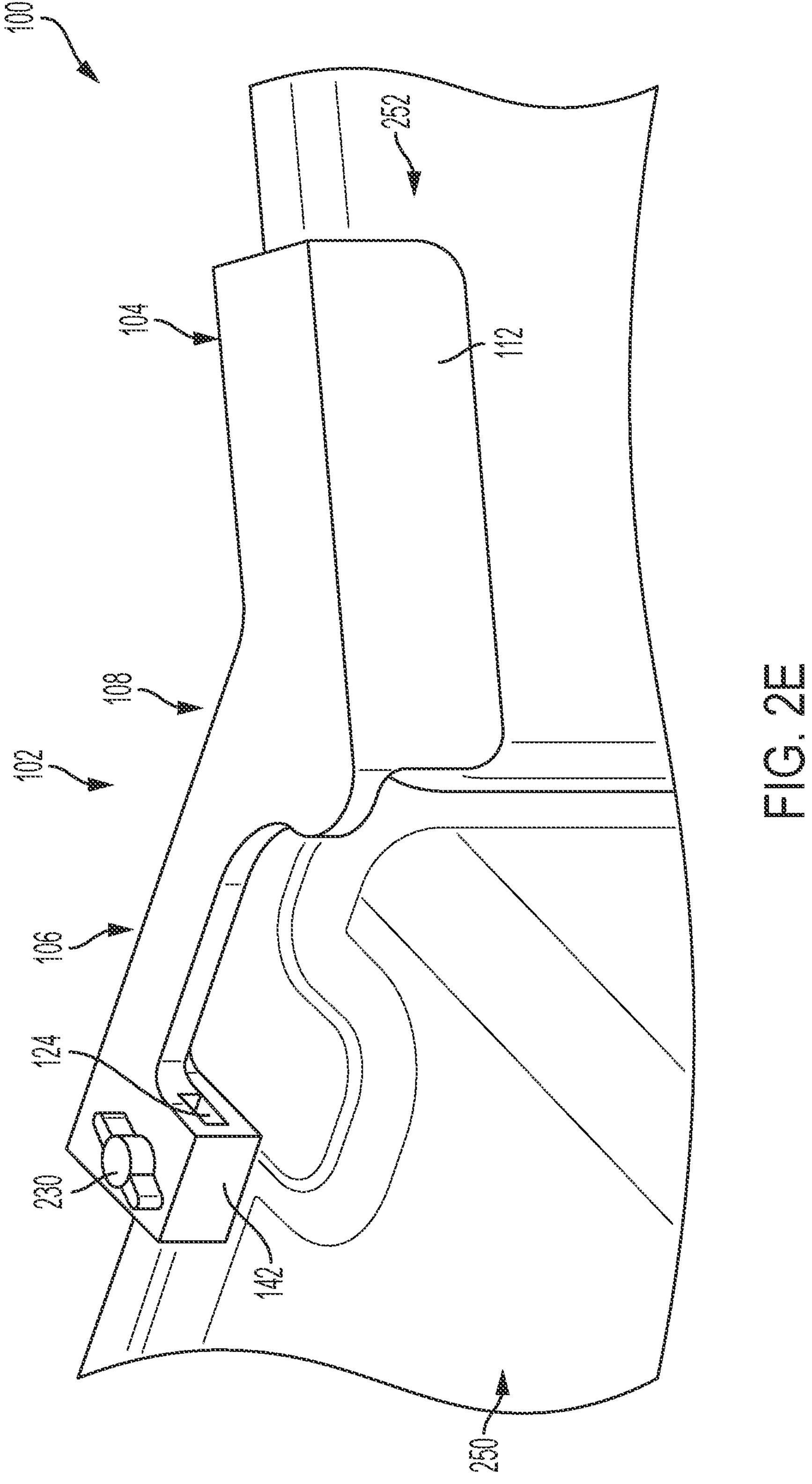

As shown in FIG. 2D, body 102 of electrical enclosure door stabilizer device 100 may have a top surface 132, and top surface 132 may be defined by top surface 134 of first portion 104, top surface 136 of second portion 106 and top surface 138 of joint portion 108.

Figure 2F:
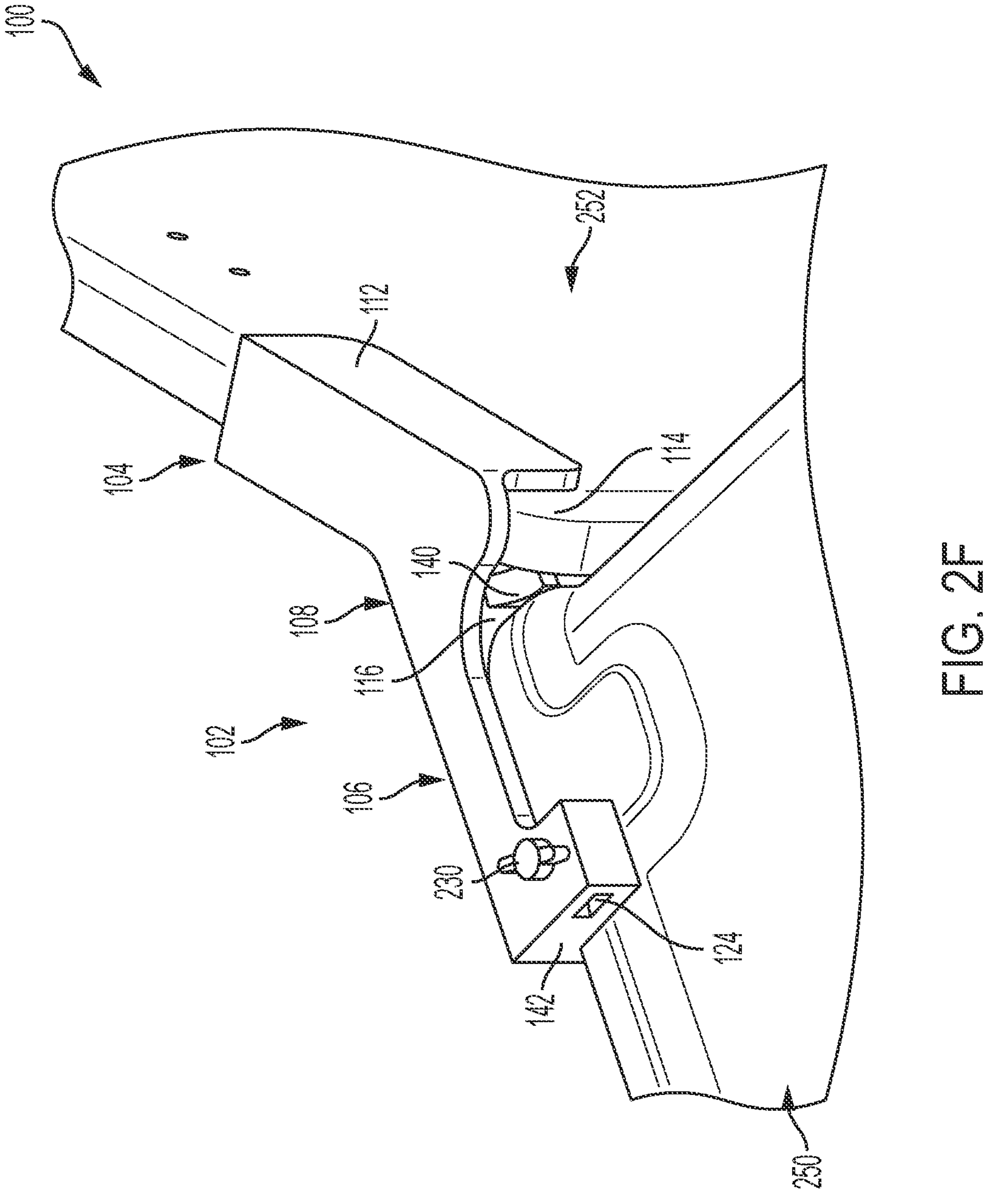

In some non-limiting embodiments, first member 110 and second member 112 may extend from first portion 104 perpendicularly to top surface 132 of body 102 and create a recess 114 (see FIGS. 2C and 2F). The recess 114 may be configured to receive door 252 of electrical enclosure 250. As further shown in FIG. 2C, first member 110 may include retention lip 126 and retention lip 126 may extend perpendicularly from first member 110 and parallel to top surface 132 of body 102, and retention lip 126 may be configured to fit electrical enclosure door 252.

In some non-limiting embodiments, third member 116 may extend from joint portion 108 perpendicularly to top surface 132 of body 102. As shown in FIGS. 2C and 2F, third member 116 may include protrusion 140 and protrusion 140 may extend perpendicularly from third member 116 and parallel to top surface 132 of body 102. Protrusion 140 may be configured to receive door 252 of electrical enclosure 250 or between door 252 of electrical enclosure 250 and electrical enclosure 250.

In some non-limiting embodiments, slot 118 of second portion 106 may be defined by first projection 142 and second projection 144, and first projection 142 may be parallel to second projection 144. As shown in FIGS. 2A-2C and 2E-2F, first projection 142, second projection 144 and slot 118 may be configured to fit over edge 254 of electrical enclosure 250.

Referring now to FIGS. 3A-3D, FIGS. 3A-3D are perspective views of a non-limiting embodiment of an implementation of another embodiment of an electrical enclosure door stabilizer device 300. As shown in FIGS. 3A-3D, securing mechanism 320 may include bolt 330 and an aperture in body 302 configured to receive bolt 330 or another fastener. In some non-limiting embodiments, securing mechanism 320 may further include cavity 324 in body 302 and cavity 324 may be configured to receive a fastener mate such as a nut. Further, the fastener mate may be dimensioned and configured to mate with bolt 330 or another fastener.

Figure 3A:
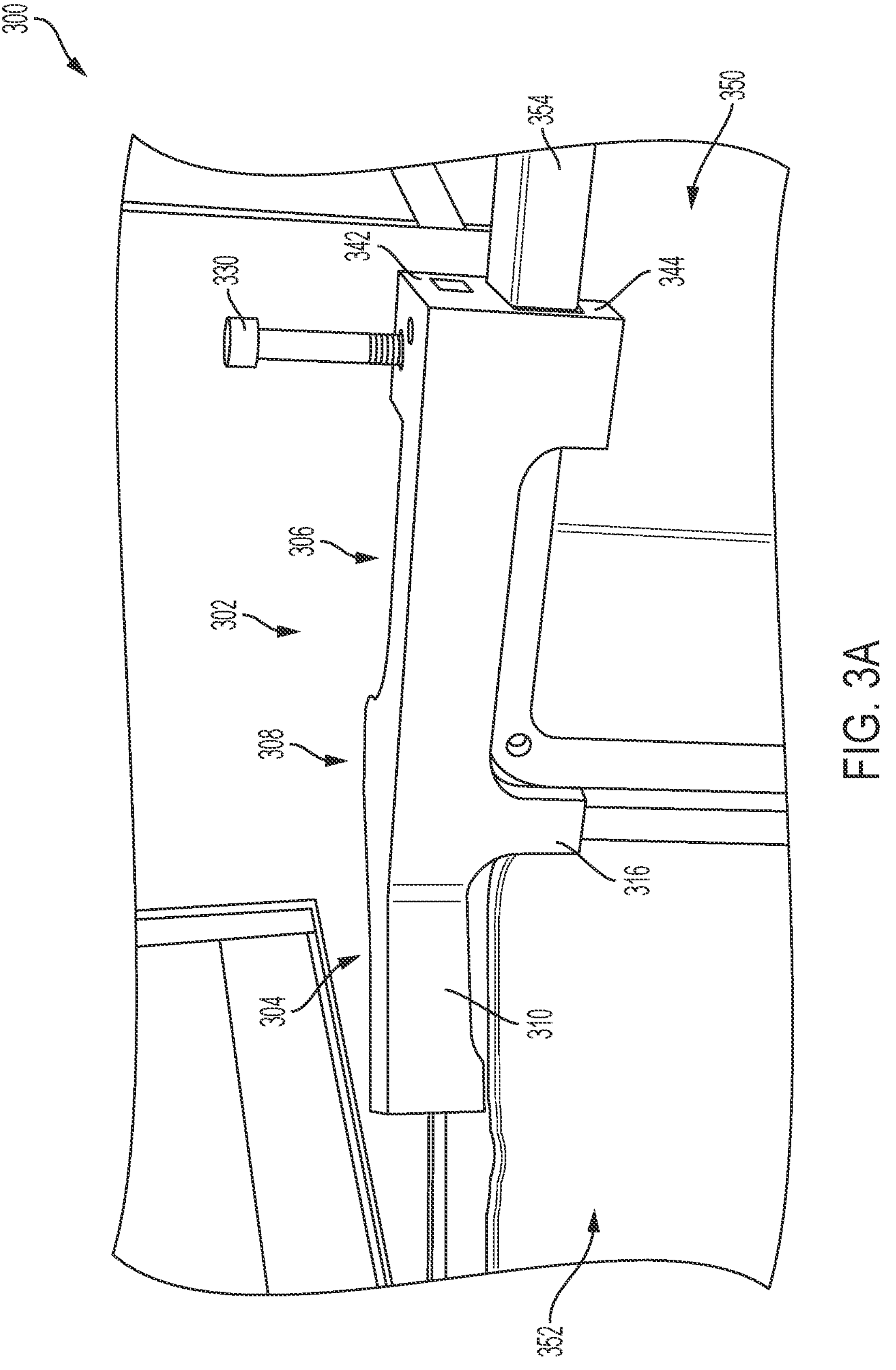
FIGS. 3A-3D are perspective views of a non-limiting embodiment of an implementation of an electrical door stabilizer device in accordance with the present disclosure.
Figure 3B:
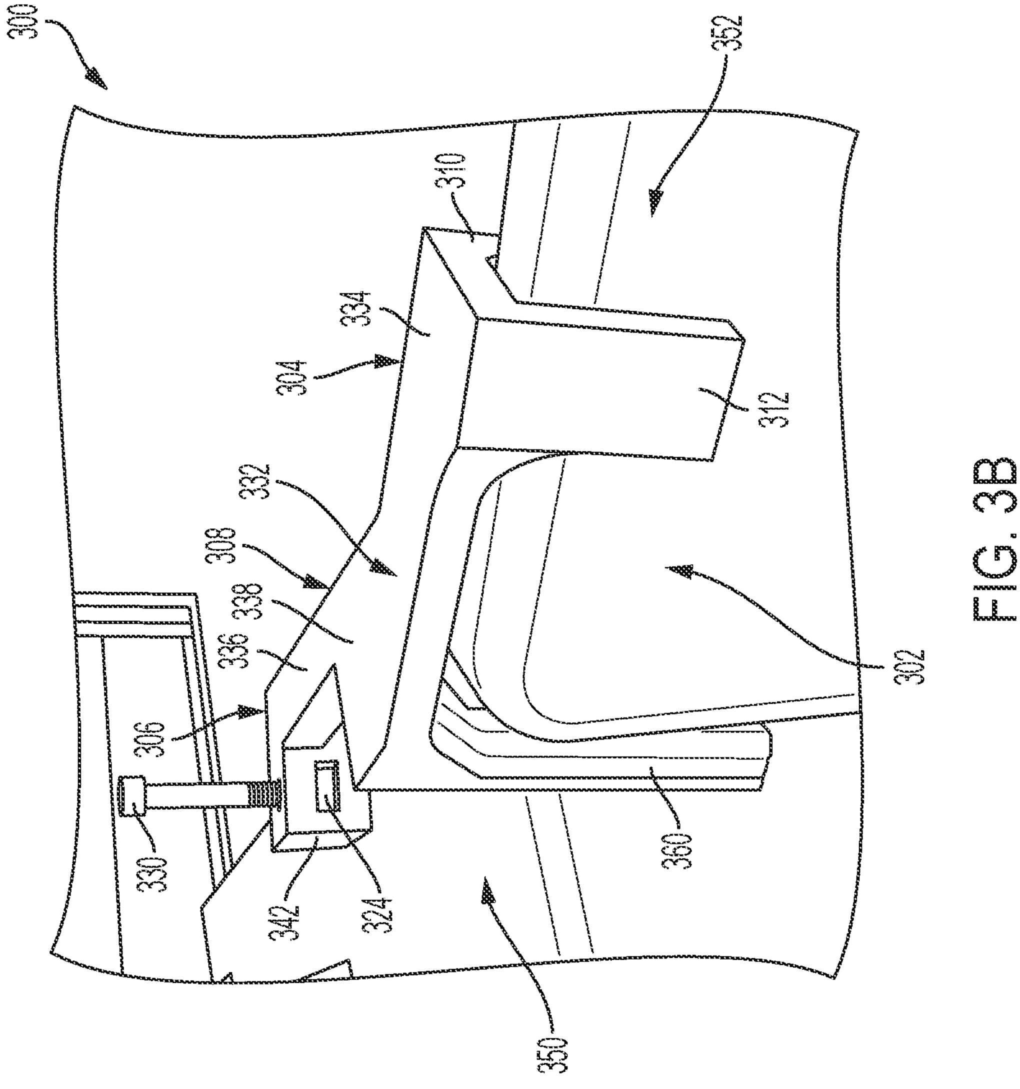
Figure 3C:
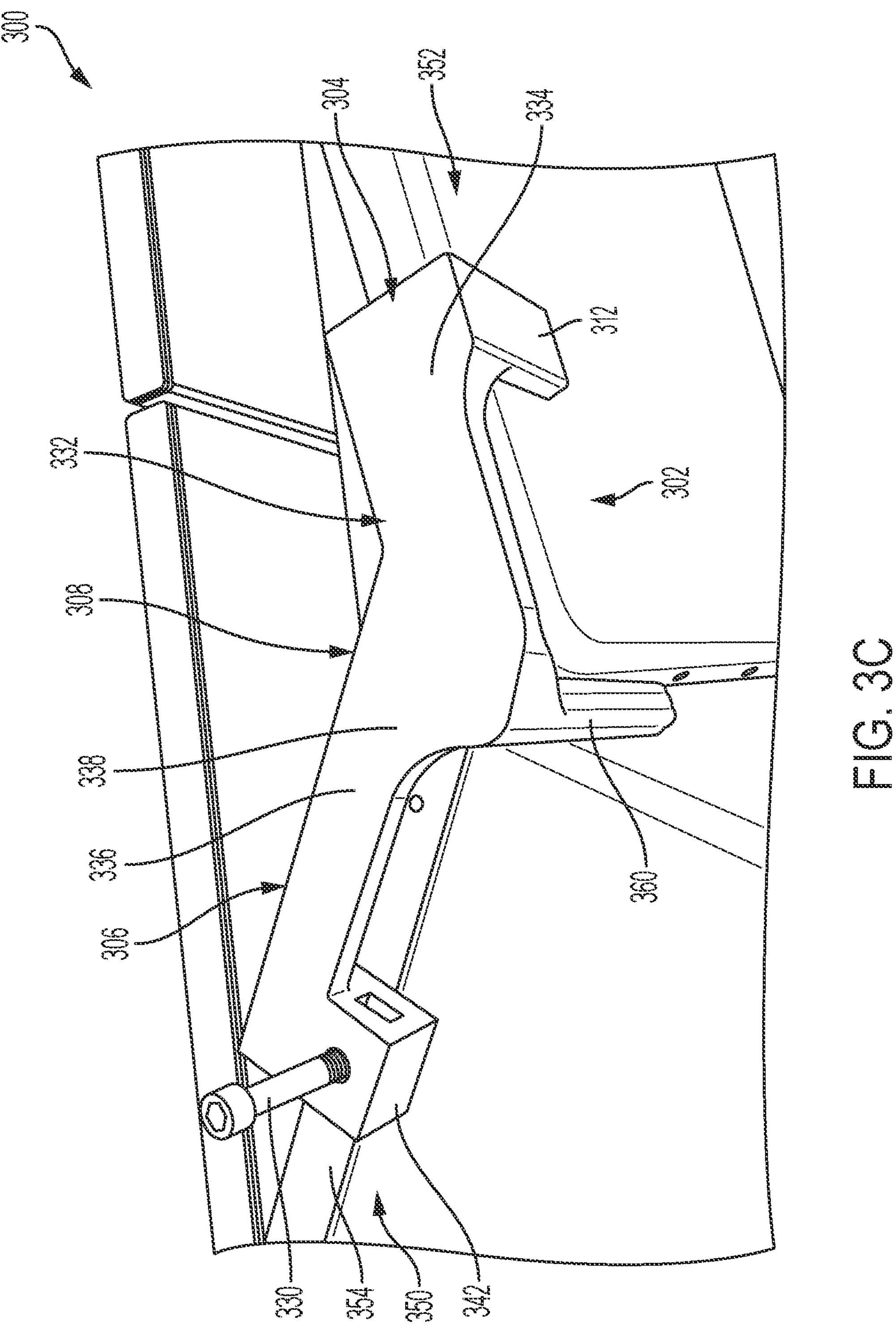
Figure 3D:
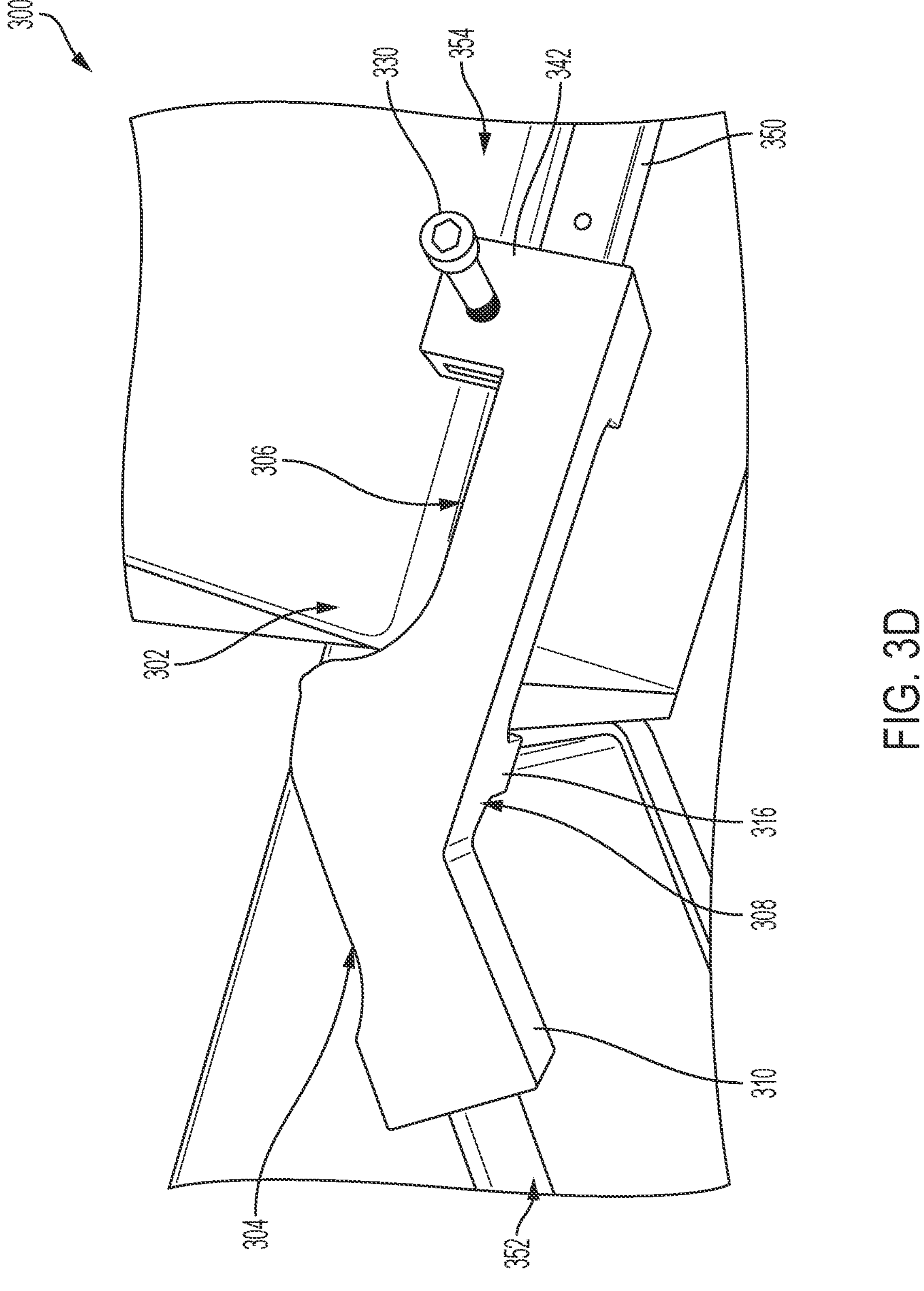

As shown in FIGS. 3B-3C, body 302 of electrical enclosure door stabilizer device 300 may have a top surface 332, and top surface 332 may be defined by top surface 334 of first portion 304, top surface 336 of second portion 306 and top surface 338 of joint portion 308. In some non-limiting embodiments, fourth member 360 may extend from joint portion 308 perpendicularly to top surface 332 of body 302. As further shown in FIGS. 3B-3C, fourth member 360 may be configured to fit between door 352 of electrical enclosure 350 and electrical enclosure 350.

Although the removable door stabilizer device is described herein with reference to holding a door of an electrical enclosure in a fixed position, it is to be understood that the device is applicable for suited to in holding other doors in a secure position with respect to the doors' frame, a wall, the body of the container, or another structure to which the door is affixed.

While several examples of the removable door stabilizer device are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

What is claimed is:

1. A removable door stabilizer device for holding a door of an electrical enclosure in a fixed open position relative to the electrical enclosure, the device comprising:

a body having a first portion and a second portion connected by a joint portion;

a first member and a second member extending in parallel from the first portion, the first member and the second member forming a recess therebetween to receive the door of the electrical enclosure;

a third member extending from the joint portion and configured to be positioned between the electrical enclosure and the door of the electrical enclosure; and a securing mechanism positioned at an end of the second portion;

wherein the second portion comprises a slot defined by a first projection and a second projection extending in parallel from the second portion, the slot positioned to receive an edge of the electrical enclosure; and wherein the securing mechanism is configured to apply a clamping force between the body and the electrical enclosure to removably secure the body to the electrical enclosure.

2. The device of claim 1, wherein the securing mechanism comprises a fastener and an aperture in the body configured to receive the fastener.

3. The device of claim 2, wherein the fastener is a threaded fastener comprising a threaded shaft and a head.

4. The device of claim 3, wherein the securing mechanism further comprises a cavity in the body configured to receive a nut, and the nut is dimensioned and configured to receive the threaded fastener.

5. The device of claim 1, wherein the joint portion positions the first portion at a fixed angle of between 90 degrees and 180 degrees with respect to the second portion.

6. The device of claim 1, wherein the joint portion positions the first portion at a fixed angle of 135 degrees with respect to the second portion.

7. The device of claim 1 wherein the body has a top surface defined by a top surface of the first portion, a top surface of the second portion, and a top surface of the joint portion.

8. The device of claim 7, wherein the first member and the second member extend from the first portion perpendicularly to the top surface of the body, and the recess formed between the first member and the second member is configured to receive a top edge of the door of the electrical enclosure.

9. The device of claim 8, wherein the first member further comprises a retention lip extending perpendicularly from the first member and parallel to the top surface of the body.

10. The device of claim 7, wherein the third member extends from the joint portion perpendicularly to the top surface of the body.

11. The device of claim 10, wherein the third member further comprises a protrusion extending perpendicularly from the third member and parallel to the top surface of the body.

12. The device of claim 7, wherein a fourth member extends from the joint portion and is perpendicular to the top surface of the body.

13. The device of claim 1, wherein the body is 3-D printed.

14. The device of claim 1, wherein the body is injection molded.

15. The device of claim 1, wherein the body is comprised of a polymeric material.

16. The device of claim 1, wherein the securing mechanism comprises a pin and an aperture in the body configured to receive the pin.

17. The device of claim 16, wherein the pin is a detent pin.

18. A removable door stabilizer device for holding a door of an electrical enclosure in a fixed open position relative to the electrical enclosure, the device comprising:

a body, the body comprised of:

a first portion having a first member and a second member extending in parallel from the first portion, the first member and the second member forming a recess therebetween to receive the door of the electrical enclosure;

a second portion having a slot defined by a first projection and a second projection extending in parallel from the second portion, the slot positioned to receive an edge of the electrical enclosure; and a joint portion connecting the first portion and the second portion at an angle and having a third member extending from the joint portion and configured to be positioned between the electrical enclosure and the door of the electrical enclosure; and a securing mechanism, the securing mechanism comprised of:

a fastener; and an aperture in the body configured to receive the fastener, wherein the securing mechanism is positioned at an end of the second portion distal to the joint portion and the securing mechanism is configured such that the aperture engages the fastener, the fastener extends through the aperture, and the fastener and the body apply a clamping force on the electrical enclosure to removably secure the body to the electrical enclosure, and wherein the body is a unitary structure of one-piece construction comprised of a single piece of material.

19. A removable door stabilizer device for holding a door of an enclosure in a fixed open position relative to the enclosure, the device comprising:

a body having a recess defined by a first member and a second member extending in parallel from the body to receive the door, a slot defined by a first projection and a second projection extending in parallel from the body, the slot positioned perpendicularly with respect to the recess to receive a portion of the enclosure, the body further having a third member configured to be positioned between the door and the enclosure; and a securing mechanism configured to apply a clamping force between the body and the enclosure to removably secure the body to the enclosure, wherein the device is configured to secure the door in an open position at an angle with respect to the enclosure, and wherein the body is a unitary structure.

* * * * *